United States Patent [19]
Kato

[11] Patent Number: 5,845,938
[45] Date of Patent: Dec. 8, 1998

[54] DEFORMABLE SUSPENSION AND FOR AUTOMOTIVE VEHICLE

[75] Inventor: Yoshihisa Kato, Nishikamo-gun, Japan

[73] Assignee: Toyota Jidosha Kabushiki Kaisha, Toyota, Japan

[21] Appl. No.: 810,483

[22] Filed: Mar. 3, 1997

[30]   Foreign Application Priority Data

Mar. 4, 1996  [JP]  Japan .................................. 8-046362

[51] Int. Cl.⁶ .................................................. B62D 21/00
[52] U.S. Cl. ..................................... 280/784; 280/123.124
[58] Field of Search ........................... 280/784, 124.134, 280/124.148

[56]          References Cited

U.S. PATENT DOCUMENTS

| 4,157,840 | 6/1979 | Kroniger et al. | 280/124.134 |
| 4,334,693 | 6/1982 | Huber | 280/124.143 |
| 4,702,515 | 10/1987 | Kato et al. | 296/189 |
| 4,720,120 | 1/1988 | Shimatani et al. | 280/124.134 |
| 4,772,043 | 9/1988 | Muramatsu | 280/124.144 |
| 5,098,118 | 3/1992 | Hayashi et al. | 280/124.134 |
| 5,322,317 | 6/1994 | Kusaka et al. | 280/124.134 |
| 5,362,090 | 11/1994 | Takeuchi | 280/124.152 |
| 5,607,177 | 3/1997 | Kato | 280/124.134 |

FOREIGN PATENT DOCUMENTS

| 37-10892-A1 | 10/1988 | Germany . |
| 38-00944-C1 | 1/1989 | Germany . |
| 41-42-587-A1 | 7/1992 | Germany . |
| 195-22-916-A1 | 1/1996 | Germany . |
| A-58-67507 | 4/1983 | Japan . |
| A-59-102606 | 6/1984 | Japan . |
| A-2-262407 | 10/1990 | Japan . |
| A-3-61105 | 3/1991 | Japan . |
| U-4-135805 | 12/1992 | Japan . |
| A-5-112111 | 5/1993 | Japan . |

*Primary Examiner*—Kenneth R. Rice
*Attorney, Agent, or Firm*—Oliff & Berridge, PLC

[57]          ABSTRACT

A suspension arm adapted for use in a suspension system of an automotive vehicle, the suspension arm being in the form of a single structure made of sheet metal pressed in an approximately L-shape and having a rear arm portion formed at one end thereof with a rear mounting portion mounted on a vehicle body structure and at the other end thereof with a support portion supporting a road wheel mounted thereon and a front arm portion bifurcated from an intermediate portion of the rear arm portion and formed at a distal end thereof with a front mounting portion mounted on the vehicle body structure at a position spaced from the rear mounting portion in a fore-and-aft direction of the vehicle, wherein a crotched portion between the front and rear arm portions is in the form of a lower stiffness portion to be buckled or deformed when applied with an impact force in the fore-and-aft direction of the vehicle, and wherein the front and rear arm portions are reinforced at their outer peripheries except for a region of the low stiffness portion to provide enhanced transverse stiffness of the suspension arm in a lateral direction of the vehicle.

6 Claims, 5 Drawing Sheets

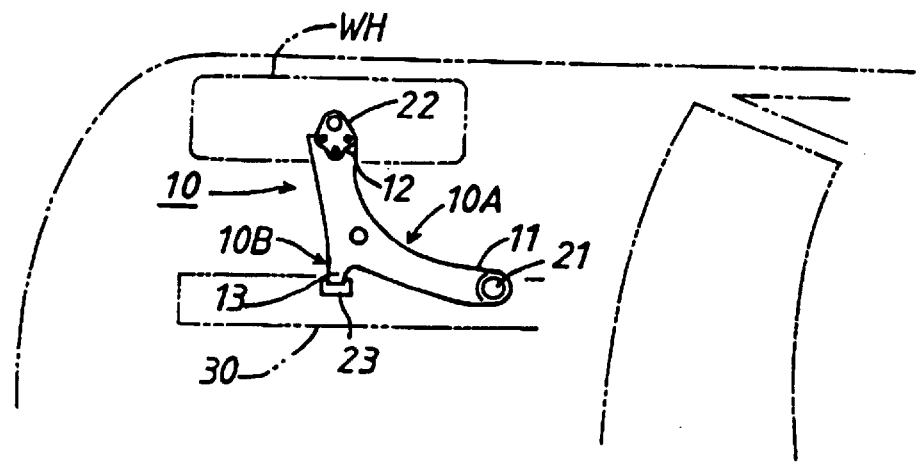
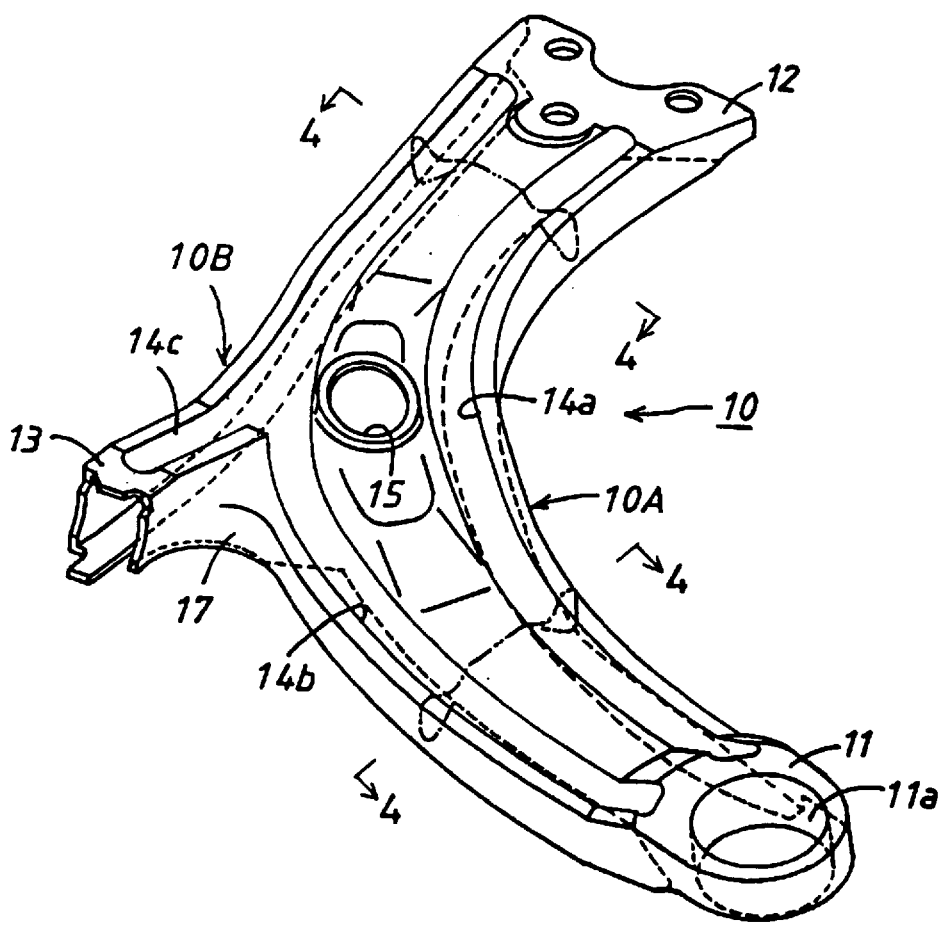

DEFORMABLE SUSPENSION AND FOR AUTOMOTIVE VEHICLE

BACKGROUND OF THE INVENTION

1. Field of the Invention

The present invention relates to a suspension arm adapted for use in a suspension system of an automotive vehicle, and more particularly to a deformable suspension arm of the type which has a pair of spaced mounting portions mounted on a vehicle body structure at two positions spaced in a fore-and-aft direction of the vehicle and a support portion supporting a road wheel mounted thereon.

2. Description of the Prior Art

Disclosed in Japanese Utility Model Laid-open Publication No. 4(1992)-135805 is a lower suspension arm of the type which is composed of a pair of long and short arm members mounted at their one ends on a vehicle body structure at front and rear positions spaced in a fore-and-aft direction of the vehicle. The long arm member is adapted to support a road wheel mounted on the other end thereof, while the short arm member is connected at the other end thereof to an intermediate portion of the long arm member by means of a pair of spaced bolts to provide a low stiffness portion. In the lower suspension arm, the connected portion of the arm members is buckled or deformed when applied with a great impact force in the fore-and-aft direction of the vehicle.

In such a lower suspension arm as described above, however, the stiffness of the arm members in a lateral direction of the vehicle is decreased as well as the stiffness in the fore-and-aft direction of the vehicle. As a result, the suspension arm can be deformed when applied with an impact force in the lateral direction of the vehicle in a sudden braking operation.

SUMMARY OF THE INVENTION

It is, therefore, a primary object of the present invention to provide an improved suspension arm which is reinforced in a lateral direction of the vehicle to enhance transverse stiffness thereof and formed to absorb a great impact force applied thereto in a fore-and-aft direction of the vehicle.

According to the present invention, the object is accomplished by providing a deformable suspension arm adapted for use in a suspension system of an automotive vehicle, the suspension arm being In the form of a single structure made of sheet metal pressed in a predetermined shape and having a rear arm portion formed at one end thereof with a rear mounting portion mounted on a vehicle body structure and at the other end thereof with a support portion supporting a road wheel mounted thereon and a front arm portion bifurcated from an intermediate portion of the rear arm portion and formed at a distal end thereof with a front mounting portion mounted on the vehicle body structure at a position spaced from the rear mounting portion in a fore-and-aft direction of the vehicle, wherein a crotched portion between the front and rear arm portions is in the form of a lower stiffness portion to be buckled or deformed when applied with an impact force in the fore-and-aft direction of the vehicle, and wherein the front and rear arm portions are reinforced at their outer peripheries except for a region of the low stiffness portion to provide enhanced transverse stiffness of the suspension arm perpendicular to the fore-and-aft direction of the vehicle.

BRIEF DESCRIPTION OF THE DRAWINGS

Other objects, features and advantages of the present invention will be more readily appreciated from the following detailed description of preferred embodiments thereof when taken together with the accompanying drawings, in which:

FIG. 1 is a schematic illustration of a suspension system of an automotive vehicle;

FIG. 2 is a perspective view of an embodiment of a lower suspension arm in accordance with the present invention;

In the drawings, the same component parts and portions will be designated by the same or similar reference numerals.

DESCRIPTION OF THE PREFERRED EMBODIMENTS

Figure 3:
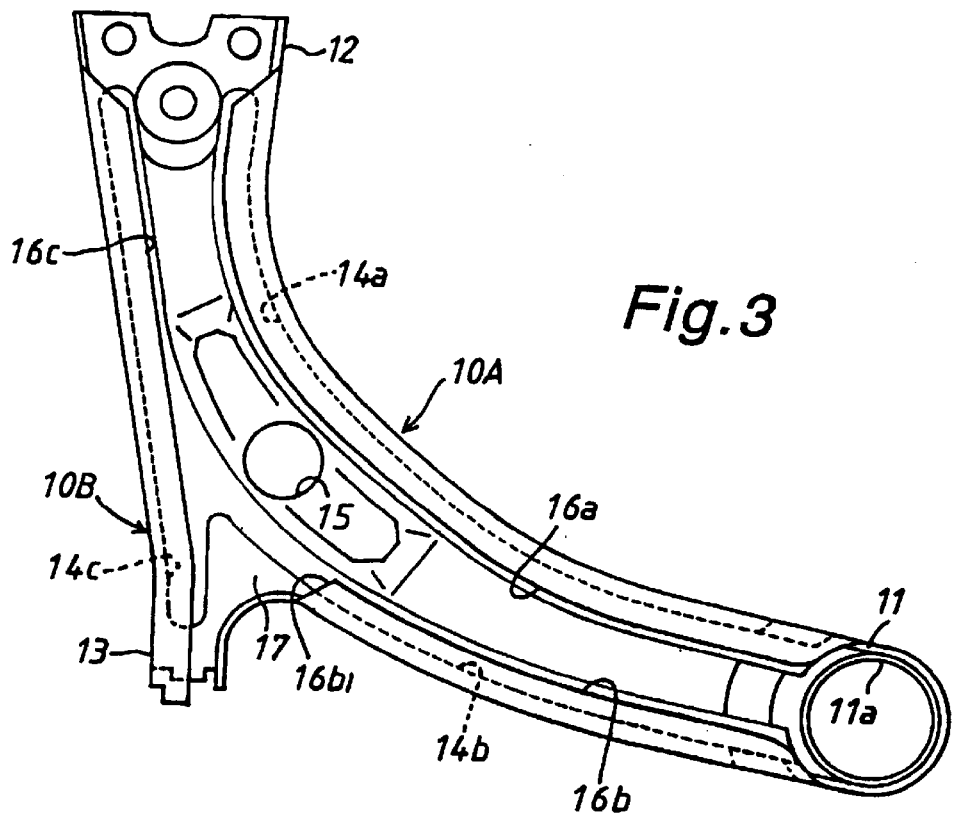
FIG. 3 is a bottom view of the lower suspension arm shown In FIG. 2.

In FIG. 1 of the drawings, there is schematically illustrated a lower suspension arm 10 in accordance with the present invention. The lower suspension arm 10 is formed in an approximately L-shape and has a rear arm portion 10A and a front arm portion 10B. The rear arm portion 10A has one end in the form of a rear mounting portion 11 formed with a vertical through hole 11a shown in FIG. 2. Coupled within the vertical through hole 11a is a metallic cylindrical sleeve 21 mounted on a horizontal side rail 30 through a columnar bush pressed therein for permitting rotary movement of the rear arm portion 10A about a vertical axis line. The side rail 30 is extended in a fore-and-aft direction of the vehicle and secured to one side of the vehicle body structure.

The rear arm portion 10A of suspension arm 10 is formed in a forwardly arcuated configuration and is provided at the other end thereof with a support portion 12 assembled with a socket 22 of a ball joint for connection to a hub carrier of a road wheel WH of the vehicle. The front arm portion 10B is bifurcated from an intermediate portion of the rear arm portion 10A in a lateral direction of the vehicle and is formed at a distal end thereof with a front mounting portion 13 welded to a metallic cylindrical sleeve 23 that is mounted on the side rail 30 through a columnar bush pressed therein for permitting rotary movement of the front arm portion 10B about an axis line of the horizontal side rail 30.

Figure 4:
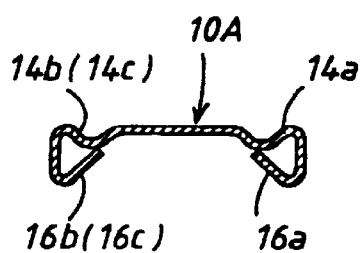
FIG. 4 is a cross-sectional view taken along line 4—4 in FIG. 2.

As shown in FIGS. 2 to 4, the suspension arm 10 is made of sheet metal pressed to form a pair of recessed portions 14a and 14b extending along the rear arm portion 10A and a recessed portion 14c bifurcated from the recessed portion 14b and extending along the front arm portion 10B. The rear arm portion 10A is formed at its intermediate portion with a cylindrical through hole 15.

As shown in FIG. 4, the suspension arm 10 is bent downward at its outer peripheries and folded inwardly at its peripheral bottom edges to form reinforcement rim portions 16a, 16b and 16c. The reinforcement rim portion 16a located at one side of the rear arm portion 10A is folded inwardly in a predetermined width in a region between the rear mounting portion 11 and the support portion 12. The reinforcement rim portion 16b is folded inwardly in a predetermined width along the other side of the rear arm portion 10A and is cut off at a position 16b1 adjacent a crotched portion 17 between the front and rear arm portions 10B and 10A. The reinforcement rim portion 16c located at the other side of the rear arm portion 10A is folded inwardly in a predetermined width in a region between the support portion 12 and the front mounting portion 13.

Figure 5:
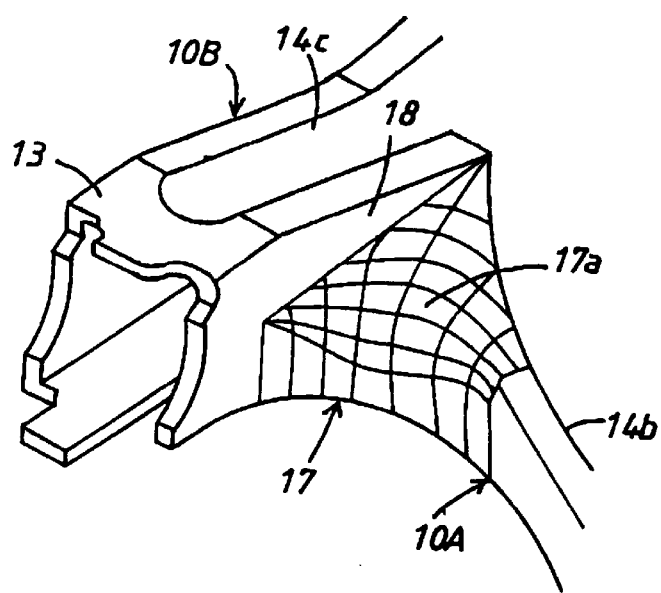
FIG. 5 is an enlarged perspective view of a crotched portion of the suspension arm shown in FIG. 2.

As shown in FIG. 5, the front arm portion 10B is gradually enlarged in height than the rear arm portion 10A toward the front mounting portion 13 to form an inside vertical wall portion 18 at a position adjacent the crotched portion 17. The crotched portion 17 between the front and rear arm portions 10B and 10A is formed thereon with a concave portion 17a the surface of which is curved downward toward the center of crotched portion 17. In the suspension arm 10, the crotched portion 17 between the front and rear arm portions 10B and 10A is buckled or deformed at the inside vertical wall portion 18 and concave portion 17a when applied with a great impact force in the fore-and-aft direction of the vehicle, thereby to absorb the impact force applied to the suspension arm 10. On the other hand, the reinforcement rim portions 11, 12 and 13 are useful to provide enhanced transverse stiffness of the suspension arm 10 perpendicular to the fore-and-aft direction of the vehicle and to firmly support the road wheel against an impact force applied thereto in a sudden braking operation. In addition, the inside vertical wall portion 18 gradually enlarged in height toward the front mounting portion 13 is useful to minimize internal stress acting thereon and to ensure sufficient stiffness of the suspension arm 10 in the lateral direction of the vehicle. Since the crotched portion 17 is formed without any reinforcement rim portion, the crotched portion 17 can be formed by a pressing process in a simple manner.

Figure 6:
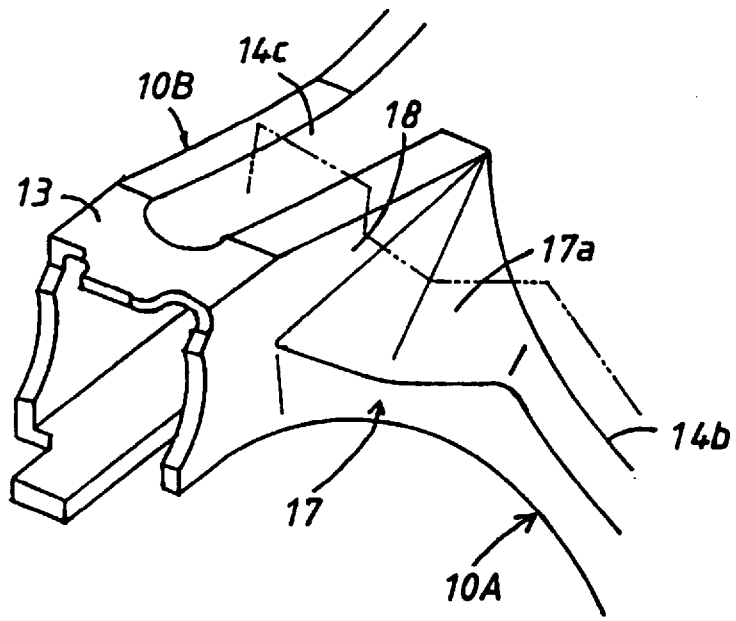
FIGS. 6 to 9 illustrate modifications of the crotched portion shown in FIG. 5.
Figure 7:
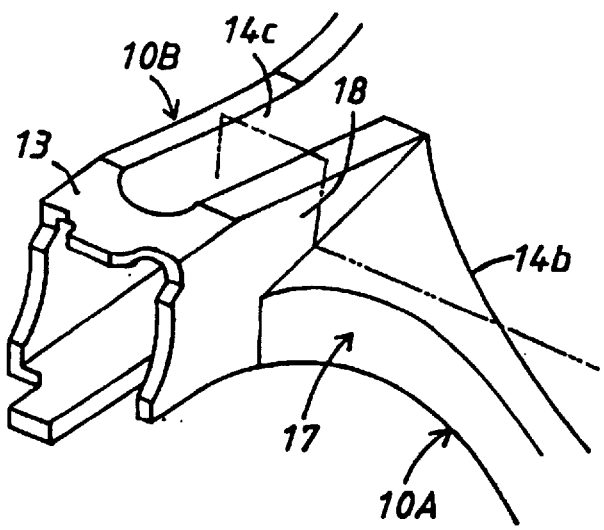
Figure 8:
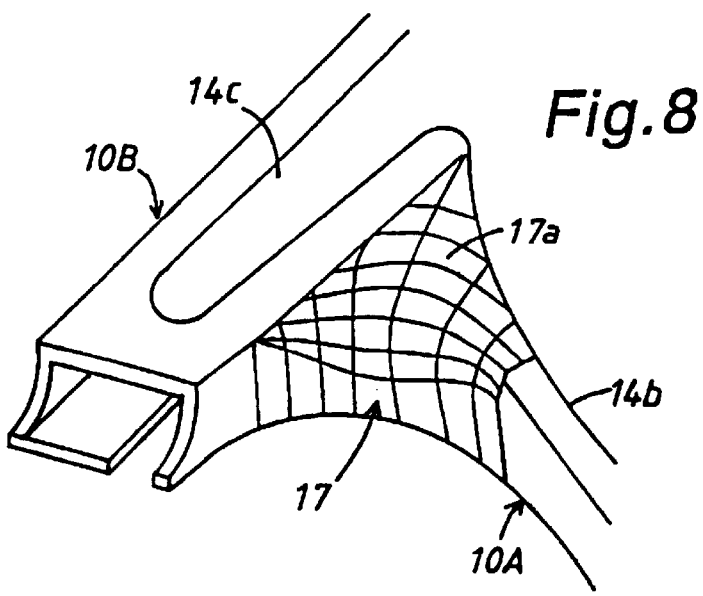
Figure 9:
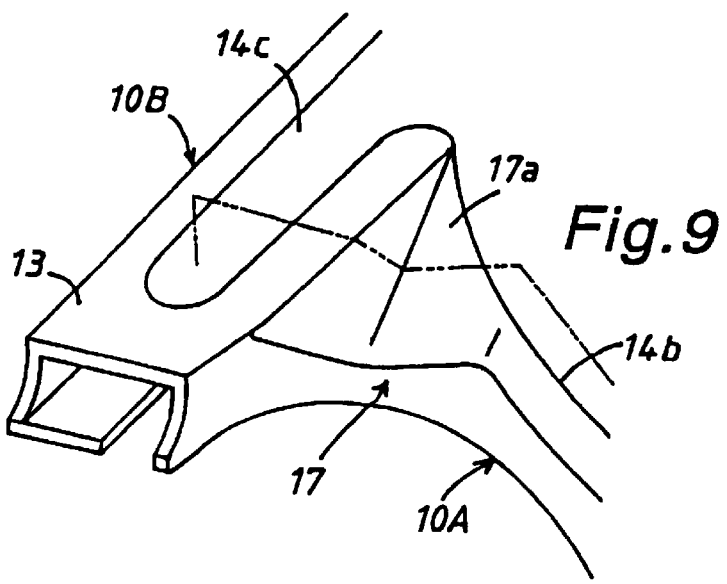

Although in the crotched portion 17 described above, the surface of the concave portion 17a has been gently curved toward the center of the crotched portion 17, the surface of the crotched portion 17 may be formed in crosssection of a V-shape as shown in FIG. 6 or formed in a flat surface as shown in FIG. 7. In a modification of the present invention, as shown in FIG. 8 or 9. the crotched portion 17 may be formed in the same height as the-front and rear arm portions 10B and 10A without forming the inside vertical wall portion 18.

Figure 10:
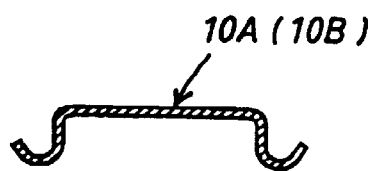
FIGS. 10 and 11 illustrate modifications of the cross-section of the suspension arm taken along line 4—4 in FIG. 2.
Figure 11:
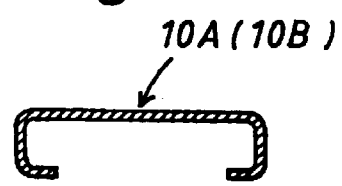
Figure 12:
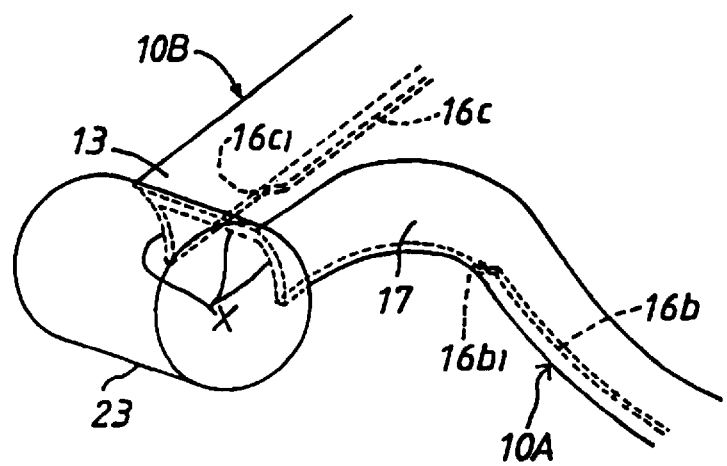
FIGS. 12 and 13 illustrate modifications of a front mounting portion of the suspension arm shown in FIGS. 2 and 3.
Figure 13:
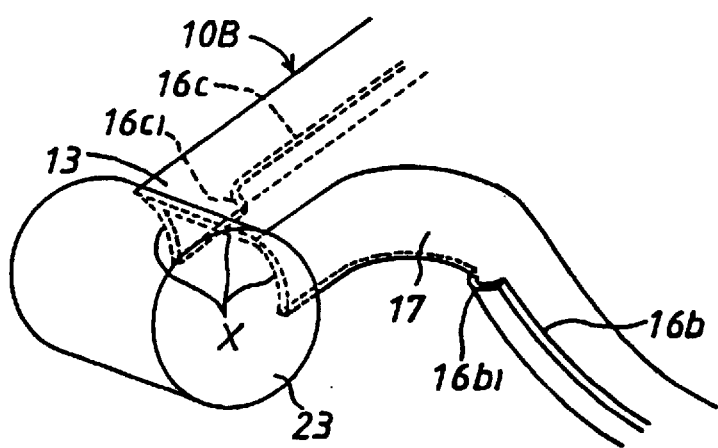

Although in the suspension arm 10 shown in FIGS. 2 and 3, the front and rear arm portions 10B and 10A have been folded inwardly at their peripheral bottom edges as shown in FIG. 4 to form the reinforcement rim portions 16a, 16b and 16c, the front and rear arm portions 10B and 10A may be bent outwardly or inwardly at their peripheral bottom edges as shown by a cross-section in FIG. 10 or 11. The suspension arm 10 may be also modified as illustrated in FIG. 12 or 13, wherein the reinforcement rim portion 16b of rear arm portion 10A is cut off at the position 16b1 adjacent the crotched portion 17 while the reinforcement rim portion 16c of front arm portion 10B is cut off at a position 16c1 spaced in a predetermined distance from the distal end of the front mounting portion 13. In such a modification. the front mounting portion 13 is welded in a simple manner to the cylindrical sleeve 23 as shown by a reference character X in FIG. 12 or 13.

What is claimed is:

1. A suspension arm adapted for use in a suspension system of an automotive vehicle. The suspension arm being in the form of a single structure made of sheet metal pressed in a predetermined shape and having a rear arm portion formed at one end thereof with a rear mounting portion mounted on a vehicle body structure and at the other end thereof with a support portion supporting a road wheel mounted thereon and a front arm portion bifurcated from an intermediate portion of said rear arm portion and formed at a distal end thereof with a front mounting portion mounted on the vehicle body structure at a position spaced from said rear mounting portion in a fore-and-aft direction of the vehicle, wherein a crotched portion between said front and rear arm portions is in the form of a lower stiffness portion to be buckled or deformed when applied with an impact force in the fore-and-aft direction of the vehicle, and wherein said front and rear arm portions are reinforced at their outer peripheries except for a region of said low stiffness portion to provide enhanced transverse stiffness of said suspension arm perpendicular to the fore-and-aft direction of the vehicle.

2. A suspension arm as recited in claim 1, wherein the crotched portion between said front and rear arm portions is formed thereon with a concave surface.

3. A suspension arm as recited in claim 1, wherein said front arm portion is formed with an inside vertical wall portion adjacent said crotched portion.

4. A suspension arm as recited in claim 1, wherein said front and rear arm portions are bent downwardly at their outer peripheries and folded inwardly or outwardly at their peripheral bottom edges except for the region of said crotched portion.

5. A suspension arm adapted for use in a suspension system of an automotive vehicle, the suspension arm being formed in a forwardly arcuated L-shape to have a rear arm portion formed at one end thereof with a rear mounting portion mounted on a vehicle body structure and at the other end thereof with a support portion supporting a road wheel mounted thereon and a front arm portion bifurcated from an intermediate portion of said rear arm portion and formed at a distal end thereof with a front mounting portion mounted on the vehicle body structure at a position spaced from said rear mounting portion in a fore-and-aft direction of the vehicle, wherein a crotched portion between said front and rear arm portions is in the form of a lower stiffness portion to be buckled or deformed when applied with an impact force in the fore-and-aft direction of the vehicle.

6. A suspension arm as recited in claim 5, wherein the support portion of said rear arm portion and the front mounting portion of said front arm portion are aligned on a line perpendicular to the fore-and-aft direction.

* * * * *